US012662066B2

(12) United States Patent
Iliffe-Moon

(10) Patent No.: US 12,662,066 B2
(45) Date of Patent: Jun. 23, 2026

(54) HOLDING DEVICE FOR A VEHICLE

(71) Applicant: Bayerische Motoren Werke Aktiengesellschaft, Munich (DE)

(72) Inventor: Etienne Iliffe-Moon, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 190 days.

(21) Appl. No.: 18/458,081

(22) Filed: Aug. 29, 2023

(65) Prior Publication Data

US 2024/0116457 A1 Apr. 11, 2024

(30) Foreign Application Priority Data

Oct. 5, 2022 (DE) ..................... 10 2022 125 658.8

(51) Int. Cl.
B60R 11/02 (2006.01)
B60R 11/00 (2006.01)

(52) U.S. Cl.
CPC ... B60R 11/0241 (2013.01); *B60R 2011/0007* (2013.01); *B60R 2011/0057* (2013.01); *B60R 2011/0092* (2013.01)

(58) Field of Classification Search
CPC ......... B60R 11/0241; B60R 2011/0007; B60R 2011/0057; B60R 2011/0092
USPC ........................................ 248/550, 682, 685
See application file for complete search history.

(56) References Cited

U.S. PATENT DOCUMENTS

| | | | | |
|---|---|---|---|---|
| 3,804,233 A * | 4/1974 | Gregg, Jr. ................. | B60R 7/04 |
| | | | 224/42.32 |
| 5,337,984 A * | 8/1994 | Houck ................... | B60N 3/103 |
| | | | 224/281 |
| 5,642,843 A * | 7/1997 | Leivan ................... | B60N 3/102 |
| | | | 224/281 |
| 6,123,307 A * | 9/2000 | Bain ...................... | B60N 3/102 |
| | | | 248/311.2 |
| 7,354,086 B2 * | 4/2008 | Park ...................... | B60N 3/108 |
| | | | 296/1.07 |
| 8,191,847 B2 * | 6/2012 | Mclaughlin ............ | B60N 3/101 |
| | | | 248/346.03 |
| 8,870,144 B2 * | 10/2014 | Zavattieri ................. | B60R 7/02 |
| | | | 248/311.2 |

(Continued)

FOREIGN PATENT DOCUMENTS

| DE | 10 2014 016 434 B3 | 3/2016 |
|---|---|---|
| DE | 10 2015 013 074 A1 | 4/2017 |

(Continued)

OTHER PUBLICATIONS

JP2012201183A Translation , 11 pages (Year: 2012).*

(Continued)

*Primary Examiner* — Muhammad Ijaz
(74) *Attorney, Agent, or Firm* — Maginot, Moore & Beck LLP

(57) ABSTRACT

A holding device for a vehicle includes at least one base plate configured to support an object, and a cavity formed in a body of the holding device. The holding device is configured to receive the base plate and to at least partially receive the object being supported by the base plate. The holding device is configured to alter a position of the base plate within the cavity depending on the object.

18 Claims, 7 Drawing Sheets

(56)  References Cited

U.S. PATENT DOCUMENTS

| | | | | |
|---|---|---|---|---|
| 2006/0278790 | A1* | 12/2006 | Park | B60N 3/105 |
| | | | | 248/311.2 |
| 2013/0279183 | A1* | 10/2013 | Yoshida | F21S 41/192 |
| | | | | 361/752 |
| 2017/0274808 | A1* | 9/2017 | Krishnan | B60N 3/108 |
| 2018/0222372 | A1* | 8/2018 | Filipovich | B60N 3/108 |
| 2019/0061589 | A1* | 2/2019 | Scott | A47G 19/2261 |
| 2019/0100155 | A1* | 4/2019 | Muiter | B60R 11/02 |
| 2021/0320528 | A1* | 10/2021 | Kim | B60N 3/101 |
| 2022/0001810 | A1* | 1/2022 | Shibata | B60R 11/02 |
| 2024/0116457 | A1* | 4/2024 | Iliffe-Moon | B60R 11/0241 |
| 2025/0091498 | A1* | 3/2025 | Killeen | B60N 3/10 |

FOREIGN PATENT DOCUMENTS

| | | | |
|---|---|---|---|
| DE | 10 2017 210 640 A1 | 12/2018 | |
| DE | 10 2017 128 019 A1 | 5/2019 | |
| DE | 10 2020 112 018 A1 | 3/2021 | |
| JP | 2012201183 A | * 10/2012 | |

OTHER PUBLICATIONS

Translation of DE102015013074A1 (Year: 2017).*
German Search Report corresponding to German Patent Application No. 10 2022 125 658.8, dated Jun. 7, 2023. (7 pages).

* cited by examiner

10

11b

12

11c

11a

50%

5°C    50°C

15

10

11b

11a

12

60%

5°C    50°C

11c

15

HOLDING DEVICE FOR A VEHICLE

This application claims priority to German Patent Application No. 102022125658.8 filed on Oct. 5, 2022, the disclosure of which is incorporated in its entirety by reference herein.

FIELD

Examples relate to a holding device for a vehicle, the holding device comprising a base plate configured so that it can support an object in a cavity of the holding device. Further examples relate to a system and a vehicle with such holding device.

BACKGROUND

In almost all modern vehicles, holders (e.g. cupholders) are provided to hold objects that a user of the vehicle takes with him to the vehicle. Such objects may be important everyday objects like smartphones and beverages to mention only some of the key objects a user typically brings into the cabin with any journey. Sometimes these objects remain in a user's pocket or bag, but more often than not they are part of the journey at some point, even if it is a short commute, local trip or road trip.

Smartphones are central to most person's lives and provide important role in communication, entertainment and productivity, for drivers and passengers alike. Whilst the passenger can connect to the vehicle wirelessly (e.g. via BLE, Apple Carplay, Android Auto, etc.) it is often easier and more convenient to use the smartphone directly (not for the driver).

Beverages such as a hot coffee or tea, water bottle, can of soda (etc.) bring hydration, comfort and social sharing moments. This is an important user need in the front and rear seats of any vehicle.

Quick, easy and convenient access to objects such as smartphones and beverages are a requirement in today's vehicles and a distinctive value add when users are choosing a vehicle. The digital experience within a vehicle is an important influence to the user's choice, the provision to central position, orient, support and charge a digital smartphone is an important symbol of the digital integration. From a product feature perspective, it supports and messages to the user the vehicle's technology and wireless digital connectivity for smart-devices. In some global regions the display of hospitality is an important sociocultural aspect, which hot or cold beverages (e.g. according to the season), hot towels, food, etc. is an important part of honoring or respecting a guest—this applies also to high-end luxury cars both in the front or rear seat experience. Additionally, some cultures desire sophisticated and elegant solutions to daily problems, delivering convenience and comfort. "Visual Luxury" and "Visual Technology" features or expressions are an important aspect of premium vehicles in some regions, for example.

However, in today's vehicles the cupholders are often primitive holes in the center console. And, the accommodation for a smartphone is not considered in a holistic way. Often there's a conflict between the location of the smartphone and beverages. Clearly there is not a clear consensus on the ideal location, arrangement or relationship between a smartphone and the cupholders in the vehicle. Additionally, smartphones are shifting to wireless induction charging rather than wired charging which needs space that cannot be provided for cupholders anymore.

SUMMARY

There may be a desire for improved concepts to hold objects like beverage containers or smartphones in a vehicle.

This desire is addressed by the subject-matter of the independent claims. Further examples of the proposed concepts are described in the dependent claims, the following description and in combination with the figures.

Embodiments of the present disclosure are based on a holding device for a vehicle, the holding device comprising at least one base plate configured to support an object, and a cavity formed in a body of the holding device and configured to receive the base plate and to at least partially receive the object being supported by the base plate. The holding device is configured to alter a position of the base plate within the cavity depending on the object (e.g. by a controller of the holding device or by an actuator of the holding device when receiving a control signal). The base plate may e.g. be articulated by an electro-mechanical actuator of the holding device.

By providing the possibility to position the base plate according to the object, different kinds of objects can be better supported or can be held more securely by the proposed holding device, for example. It may be possible, for example, to position the base plate in a first position for improved support of a smartphone, in a second position for improved support of a cup (e.g. a cup with a handle; e.g. by reducing the depth of the position so that the handle does not go into or interfere with the holder), or in a third position for improved support of a bottle.

According to an example, the holding device comprises at least two base plates, wherein the holding device is configured to alter the positions of the two base plates independently of each other. For example, the holding device may comprise a plurality of base plates such that an effective size and/or form of an aperture of the holding device can be adapted to the size and/or form of the object. For example, it may be possible to lower two or more of the base plates, if the object has a footprint wider than the surface of one single base plate. It is possible that the base plate may change/adapt as well (e.g. shape, angle, orientation, etc. of the base plate), e.g. to incline at least one base plate of the holding device (e.g. the base plate may be inclinable in different directions). In this way, the holding device can be adapted to support both small and wide objects more securely.

According to an example, the holding device comprises at least three base plates (e.g. more than three base plates), wherein the three base plates are arranged in a honeycomb pattern or similar geometric array (can e.g. be symmetric or asymmetric). In such pattern, e.g. all base plates may form a large surface when being positioned at the same height. This may enable to alter multiple base plates at once to support large objects or to alter them individually for support of multiple small objects. Having three or more separate base plates may enable placing different objects at once on the cup holder. For example, in regions with increased need for hydration and drinks it may be common to drink coffee and water at the same time. Plus there are cupholder accessories and other consumables shaped to go in a cupholder (e.g. chewing gum). Alternatively, the holding device may comprise two base plates which may enable a smaller design of the holding device, for example.

According to an example, the holding device is configured to receive a signal from a sensor when the sensor detects an object approaching the holding device. The holding device is configured to elevate the base plate when the signal is received by the holding device. In particular, it may be possible to lift the base plate beyond the cavity, e.g. to make it easier to place an object on the base plate. Thus, there is not a need for the user to put the object in a cavity but to place the object on the base plate which is protruding from the holding device.

According to an example, the holding device is configured to receive a signal from a sensor when the sensor detects a user approaching the holding device, and wherein the holding device is configured to elevate the object supported by the base plate when the signal is received by the holding device. For example, the object may be supported securely by positioning a large portion of the object in the cavity. However, this may make it difficult for the user to grasp the object. Hence, elevating the object to the user may make it easier to take the object back from the holding device which may be advantageous especially when driving. Further, a cleaning mode may be enabled. For example, cleaning the bottom of conventional other cupholders is difficult—by elevating the holder it makes it easier to clean the base of the cupholder (e.g. it is like turning the cupholder inside out).

According to an example, the holding device is configured to receive a signal from a sensor when the sensor detects that no object is present at the holding device. Further, the holding device is configured to position base plate planar with a surface of the body of the holding device when the signal is received by the holding device. This may result in a plane surface and/or closed cavity of the holding device when there is no object present. In this case the base plate may be positioned to form a cover of the cavity. For example, the base plate may have an appearance according to the surrounding interior of the vehicle such that the holding device is not visible when not in use. This may enable a more elegant appearance in contrast to other cupholders that can be closed by a lid, for example.

According to an example, the holding device further comprises an inductive electrical power supply device and/or a thermal device, configured to affect the object being supported by the base plate. For example, the inductive electrical power supply device and/or thermal device may be incorporated in the base plate or positioned in different base plates. The power supply and/or thermal device may be activated in accordance to the kind of object that is supported by the base plate. For example, a first object on a first base plate may be charged wirelessly (e.g. smartphone) and a second object may be cooled on a second base plate (e.g. drink in a cup). For example, a smartphone may be charged wirelessly and thermally cooled. In the case of a smartphone this may be beneficial to prevent overheating whilst charging, for example high screen brightness and high processing demands (e.g. computation, CPU usage, GPS-tracking, WiFi communication, camera etc.). Additionally, things that drain the battery (requiring charging) typically generate heat—so therefore charging and cooling naturally go together. For example, exposure to elevated temperatures can significantly reduce the life of the battery. E.g. some studies show an average temp of 25° C. can lead to ~20% loss per year (from maximum battery capacity), average temp of 40° C. can lead to ~35% loss per year.

According to an example, the holding device is configured to detect (e.g. by using a sensor of the holding device itself or by using an external sensor) a characteristic of the object (e.g. size of the object; e.g. type of object; e.g. orientation or angle of the device—if a phone is held at a particular angle by the user (the phone's MEMS sensor angular data may be shared with the system) the device may adapt the support angle to match the user's phone) and to adapt the position of the at least one base plate according to the characteristic. The holding device may be adapted to control further features of the holding device (e.g. cooling or heating of beverages; activating wireless charging for smartphone) according to the characteristic, for example automatically.

According to an example, the position of the at least one base plate is adapted to control an orientation of the object in relation to a user of the holding device. The system may adapt in more specific ways for a smartphone, such as adjusting the smartphone angle to enhance usability or responding to the state/activity/functionality of the smartphone (e.g. charging, receiving a call, active navigation, notification, video call, etc.). According to an example, the holding device is configured to tilt the at least one base plate depending on the characteristic of the detected object. For example: tilted base plate when a smartphone is detected; even base plate when a cup is detected.

According to an example, the holding device further comprises a magnetic element placed at the base plate to support the object more securely. This may allow for improved support of smartphones or magnetic cups or bottles, for example.

According to an example, the holding device further comprises an illuminating element configured to emit light depending on a status of the object (e.g. hot or cold beverage indicated by red or blue color) and/or a status of the holding device (e.g. thermal device heating or cooling the object indicated by the corresponding color).

An aspect relates to a system comprising a holding device as described above or below, and a sensor device configured to detect a characteristic of an object to be supported by the holding device. The system is configured to control the holding device depending on the characteristic. The sensor device may e.g. comprise a camera and computer vision software to analyze the object. The system may e.g. comprise a sensor configured to send a signal to the holding device to drive an actuator of the holding device. Controlling the holding device may comprise inclining (e.g. both elevating and inclining) the base plate when the object is a smartphone, for example, or lowering the base plate further when the object is a tall beverage container.

For example, the system further comprises a control device configured to control the holding device (e.g. button or touchscreen with GUI). For example, the system may include a touchscreen to enable controlling by a user of features like position of base plates, temperature of the object, charging of the object, etc. For example, the touchscreen element may be integrated in a honeycomb pattern with the base plates. For example, the touchscreen element may have an identical form as the base plates so that improved integration of the touchscreen element into the holding device may be achieved. Additionally or alternatively, a GUI for the system may integrated within the vehicle's infotainment system and main CID touchscreen—e.g. replacing or mirroring the touchscreen on the device itself.

For example, the system is configured to output a virtual representation of the object in a virtual reality environment. The system may be synchronized with a digital or virtual AR/VR/MR component, so that the position and status of the object (e.g. beverage or smartphone) can be seen in that virtual format (e.g. AR/VR/MR, etc.) at the actual position. Consequently, computer vision and sensing—recognizing and identifying users and objects may be integrated in the system, e.g. in a board computer of the vehicle. This may make it easier for the user to find the position of the object in the car when using VR-glasses, for example.

Aspects relate to features of a virtual representation of objects (e.g. in VR or AR) relating to the interaction between a user and physical objects (e.g. the holding device or object in the holding device) within the cabin, and improving the current virtual experience without disrupting (or minimizing the disruption to) the user's immersion in the virtual experience. For example, according to other concepts, a user must either activate the camera bypass (cameras on the headset that provide a video feed into the headset that overrides the virtual experience) or the user removes the headset, or raises the headset to peep from under the headset. This results in disruption to the experience and break in the immersion in the virtual experience, which can be jarring or disruptive from a mental perception point of view.

An advantage may be seen in the improved intersection (e.g. user relationship and interaction) between the user and the physical feature and/or object to determine what is rendered in the virtual VR or AR space, as described in examples in the following. This may include the user's intent relative to the vehicle feature and/or object. For example sensing intent—the user's hand reaches towards a cabin feature or object (e.g. coffee cup and/or cupholder); For example sensing intent may involve interpreting a user interaction gesture—the user hands and fingers make up a gesture of some form: These gestures may be unique as they are not necessarily the same gestures commonly used with a touchscreen interface; for example the index finger or thumb points to the vehicle feature or object—e.g. the finger is pointed as if to touch, find or push a button; for example the hand/fingers are in a "c-shape" reaching out to the object—e.g. the c-shape is the natural shape the thumb and fingers would make as a hand opens to grasp an object; for example multiple fingers of a cupped-shape hand reach out to locate and pull a latch or handle. Additionally, there is the relationship between the vehicle feature (e.g. cupholder, phone-holder, etc.) and objects (e.g. coffee cup, phone, etc.) that can be observed through computer vision to trigger different logic, states or events in the system (e.g. cupholder state vs. coffee cup state; e.g. situation such as empty cupholder vs. user holding cup vs. no cup in cabin, or cupholder with coffee cup vs. object that is not a coffee cup (e.g. phone or other object). Also, there is a situation where the vehicle feature does not involve an object and the user interacts with it directly (e.g. steering wheel, window or seat buttons, control knob, seat belt, door handle, door lock, arm-rest latch, storage compartment latch, etc.) Only the vehicle feature and/or object of interest is selectively displayed or highlighted in the VR or AR experience. Using object recognition and interpretation of user intent it may be possible to selectively display only the relevant object and/or vehicle feature. The other areas that are not relevant are masked or excluded (not virtually or digitally rendered) from the virtual image. This e.g. reduces the disruption to the VR or AR experience. (Conventionally today the user would need to lift up the headset or activate the camera bypass to see the real world (e.g. see the coffee cup to take a drink) which is highly disruptive to the VR/AR experience). For example, the user reaches for or towards the coffee cup and/or the user touches the coffee cup or is within a certain proximity of the coffee cup. The coffee cup is selectively displayed (only the coffee cup (a real image via the camera on the HMD and/or cabin interior, or a virtual image interpreted via camera, object recognition and rendered as a virtual image) appears in the virtual image. All other aspects of the interior are not displayed in the virtual image (i.e. the rest of the environment, non-relevant objects, etc. are masked or excluded from the virtual image). Subsequent interactions with that object can affect whether that object is displayed in the virtual experience or influence the appearance of the virtual object (e.g. the object color or appearance may change depending on the interactions and/or state of the object—e.g. if the coffee cup has been touched or not, is hot/cold, empty/full, or if a smartphone receives a notification, needs charging, etc.). For example, the object may fade or disappear from the virtual view after the coffee cup is released or a period of time has elapsed, or the hand leaves a certain region or moves away from the coffee cup. For example, the user reaches towards the side of the seat and the seat controls appear virtually—e.g. giving an X-ray view of a controller that a user cannot normally see easily (usually seat controls on a seat are hidden from view and the user interacts with the control purely by blind touch (feeling the shape of the controller). For example, the user reaches to a window controller, storage compartment, door lock, etc. Additionally, the vehicle feature and/or object may be contextually relevant to the VR or AR experience (e.g. the virtual experience may have a GUI aspect that virtually reveals the relevant object or vehicle feature; e.g. an incoming phone call or text message—smartly reveals a virtual image of the actual smartphone; e.g. the GUI may issue a notification or have a button for an aspect related to an object or vehicle feature—e.g. "are you thirsty?", "drink", "window", "climate control", etc.)

A specific aspect of the virtual experience may be trigger by an interaction with the IPA (intelligent personal assistant/digital assistant) (e.g. the user may ask a question or issue a statement to the IPA, such as the saying "I'm thirsty", "where's my phone", "I'm hot" or "I'd like to open the window"; the system would respond by interpreting the interaction and selectively displaying the object and/or vehicle feature/location that is relevant.

Additionally, the system (e.g. using the vehicle cabin sensor system, e.g. interior cameras) using object detection/tracking may selectively display a virtual representation (either camera pass-through or digitally (CGI) rendered) of the controller(s) for the VR or AR HMD/glasses. Additionally, the system may apply machine learning ML/AI techniques to understand historic patterns during a journey, across multiple journeys or over time to make predictions over relevant vehicle features and/or objects and the interpretation of user intent or user gestures. For example, user habits relative to a beverage, smartphone (e.g. where the user typically places the phone, frequency of use, etc.), the typical use of a storage feature (e.g. cupholder).

An aspect relates to a vehicle comprising a holding device as described above or below and/or a system as described above or below, wherein the holding device is controlled according to a status of the vehicle. The vehicle status may be: parked vehicle, stationary vehicle, driving vehicle, etc. The status may comprise vehicle dynamics, for example: road conditions, acceleration/motion of vehicle (e.g. need to stabilize or hold beverage). For example, when driving the vehicle fast, the base plate may be positioned as to hold the object more securely than at low speed (which may allow for loose support that may make it easier for a user to take the object from the holding device, for example). It may also be possible to have the base plate motion compensate or stabilize the object for bumps and cornering, for example, so that the beverage is not spilled or phone does not vibrate, for example.

BRIEF DESCRIPTION OF THE DRAWINGS

Some examples of apparatuses and/or methods will be described in the following by way of example only, and with reference to the accompanying figures, in which.

DETAILED DESCRIPTION

Figure 1A:
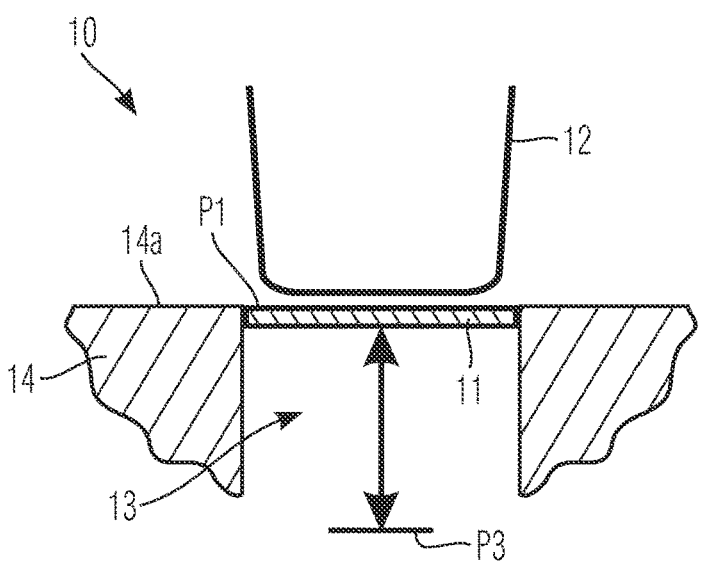
FIG. 1*a* shows a representative cutaway view of a holding device with a base plate in a first position.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Vehicles can provide cupholders for holding beverages during a journey. Also smartphones (e.g. when not connected to the vehicle) are often placed in a cupholder or convenient surface of the cabin by a passenger to have a phone call (e.g. on speaker mode) or video call (e.g. facetime). Incidentally the cavity of the cupholder acts as a "horn" to amplify and direct the audio sound coming from the smartphone speakers.

Today's vehicle cupholders have become multi-functional places for almost anything that a user brings into the vehicle that is of a relevant size (within reason). Natural user behavior means that it may be possible to often see a multitude of things in the cupholders, that were never intended to go in a cupholder (e.g. keys, wallet, lipstick, pens, receipts, tissues, purses, moisturizer, candy, snacks, food, etc.) and in some cases intended for a cupholder (e.g. vehicle accessories, chewing gum/candy in cupholder sized containers, etc.) Additionally, a number of "smart" beverage containers are available that are rechargeable and app connected that offer smart features such as maintaining optimal temperature and monitor water consumption/hydration, etc.

Cabin sensing technology is progressing and will reach ubiquity in the coming years. For example, interior cameras (e.g. RGB, IR, TOF, Lidar, etc.; e.g. with advanced features such as thermal imaging, depth sensing, point cloud, etc.) will be wide spread and already now enable new capabilities and use cases for the future. For example, monitoring the presence, position, orientation, motion, temperature, etc. of people and/or objects, and additionally monitoring the relationships between the vehicle, users, objects, etc. This technology along with data processing technology, such as Artificial Intelligence, Machine Learning, Neural Networks, etc. will be able to consistently recognize, identify, pattern and predict current and future behaviors, actions, adapt the vehicle and/or digital life experiences, function and features in a contextually relevant manner.

Today's vehicles have holders or support features for things like beverage containers and smartphones. However, these are primitive interior elements that are designed for static, average sized objects—i.e. a today's cupholder is a hole designed for a nominal size/diameter cylindrical shape with a fixed depth.

For example, currently cupholders cannot accommodate a container/cup with a handle, cannot adapt to different height containers (for example a tall container will obscure and interfere with the infotainment controls and programmable multi-function buttons). For example, there is a conflict between the placement of a smartphone and cupholder—for convenience and comfort, they need to be all at or within arm's reach (and not too close (limited by shoulder and elbow articulation) and not too far). Frequently, especially in some regions, users will have multiple beverages (e.g. coffee and water) and smartphones.

In some vehicles, the interior design forces the cupholders to be located in an inconvenient and uncomfortable location for driver/passenger reach/access. This could also be deemed a safety risk (e.g. eyes off the road, hand off the steering wheel, distraction, time of disengagement, etc.) when reaching for a beverage in the cupholder. Clearly the designers prioritized smartphone access over cupholder access. Additionally the smartphone holder does not allow for wireless charging (or convenient wired charging).

The current solutions have fixed functionality and do not allow for configurability, it is one or the other (smartphone or cupholder). Current solutions do not allow for flexibility to accommodate other aspects to improve performance or enhance features or convenience. Whilst heated or cooled cupholders are available solutions. There is not a solution that provides power delivery and thermal conditioning—these properties are both relevant for a smartphone. Cooling of a smartphone is an issue (smartphones can overheat whilst charging and/or heavy processor/computational demand, and/or from solar gain (direct exposure to sunlight). Charging a smartphone during a drive is an important feature for power delivery during the journey, but also after the journey (the drive is often an opportunity to charge a phone). For example, overheating or prolonged elevated temperatures can permanently damage the battery of a phone and reduce battery life, and reduce charging times. Additionally, induction charging itself also may cause heating (thermal gain) effects in both the transmitter (baseplate) and receiver (phone) due to the physics of induction charging (efficiency can e.g. be in ~80-90%, so 20-10% of losses can be lost as heat). Beverages obviously benefit from maintaining temperature or heating/cooling, additionally induction charging of smart beverage containers (or other applications/solutions, see below) is a future possibility. Therefore, there is technological alignment between the smartphone and cupholder functionality/aspects.

Additionally a power supply via induction creates an opportunity for new vehicle (e.g. industrial or user created, e.g. 3D printed) accessories, that is compatible with user needs/desire and/or a new smart system.

Therefore, a new holding device is proposed that enables improved support for a variety of objects in a vehicle.

Figure 1B:
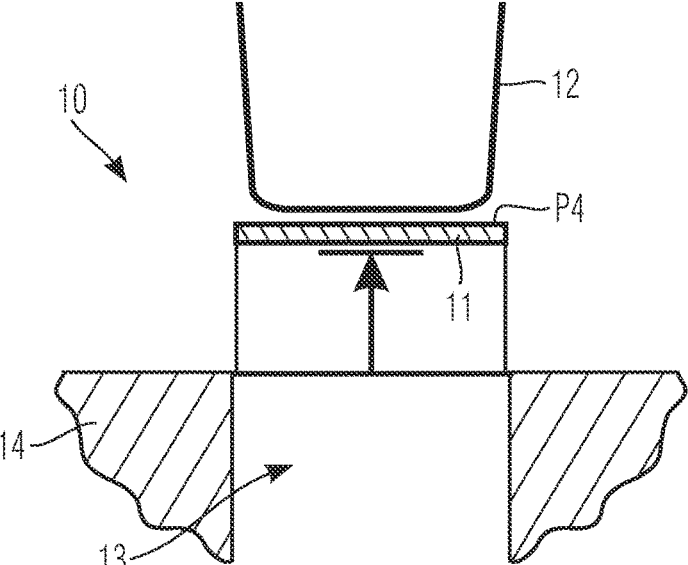
FIG. 1*b* shows a representative cutaway view of the holding device of FIG. 1*a* with the base plate in a second position.
Figure 1C:
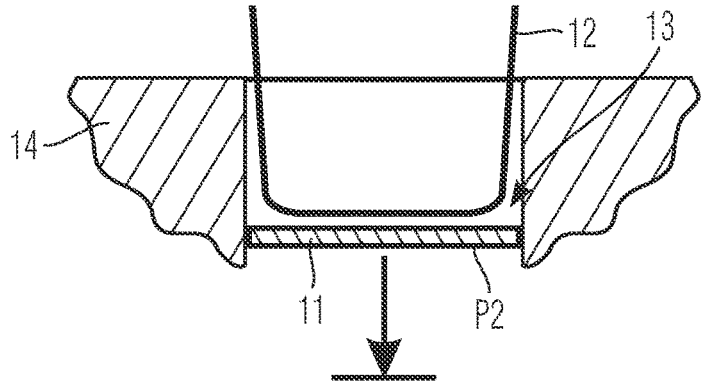
FIG. 1*c* shows a representative cutaway view of the holding device of FIG. 1*a* with the base plate in a third position.

FIGS. 1a to 1c show a holding device 10 with a base plate 11 in different positions P1 to P4. The base plate 11 is configured to support an object 12, e.g. a smartphone or a beverage container. The holding device 10 comprises a body 14 with a surface 14a and a cavity 13, wherein the position of the base plate 11 can be altered at least within the cavity 13 (e.g. from the first position P1 to a lower position P3). As an advantage of the proposed holding device 10, the position of the base plate 11 can be set according to the object 12 (e.g. size of the object 12) which is to be supported by the holding device 10.

FIG. 1a shows the base plate 11 in a neutral position P1, i.e. the base plate 11 is planar with the surface 14a of the body 14 of the holding device 10. When no object 12 is present for example, the cavity 13 can be hidden by the base plate 11 in this way. The surface structure of the base plate 11 may be similar or equal to the surface structure of the body surface 14a so that in the neutral state P1 the cavity 13 for receiving objects 12 may be covered which can give an improved appearance compared to other holding devices (e.g. seamless connection of top side of the base plate 11 with the body surface 14a). For example, the base plate 11 can be lowered to a lower position P3, e.g. enabling the holding device 10 to support tall objects 12.

FIG. 1b shows the base plate 11 in an upper position P4, i.e. elevated beyond the cavity 13. For example, the holding device 10 can elevate the base plate 11 when detecting an approaching object 12. This may enable a higher comfort for a user when placing objects 12 in the holding device 10 or taking it back. For example, after having received the object 12, the base plate 11 can be lowered back to the cavity 13 to enable more secure support for the object 12.

FIG. 1c shows the base plate 11 in a middle position P2 that is adequate for the size of the object 12. For example, if the object 12 was taller, the base plate 11 could still be lowered down to the lower position P3. By providing a base plate 11 with adjustable position P1-P4, the holding device 10 can adjust to objects 12 individually which can enable better support for objects of different size or make the use of the holding device 10 more comfortable for a user, for example.

Figure 2:
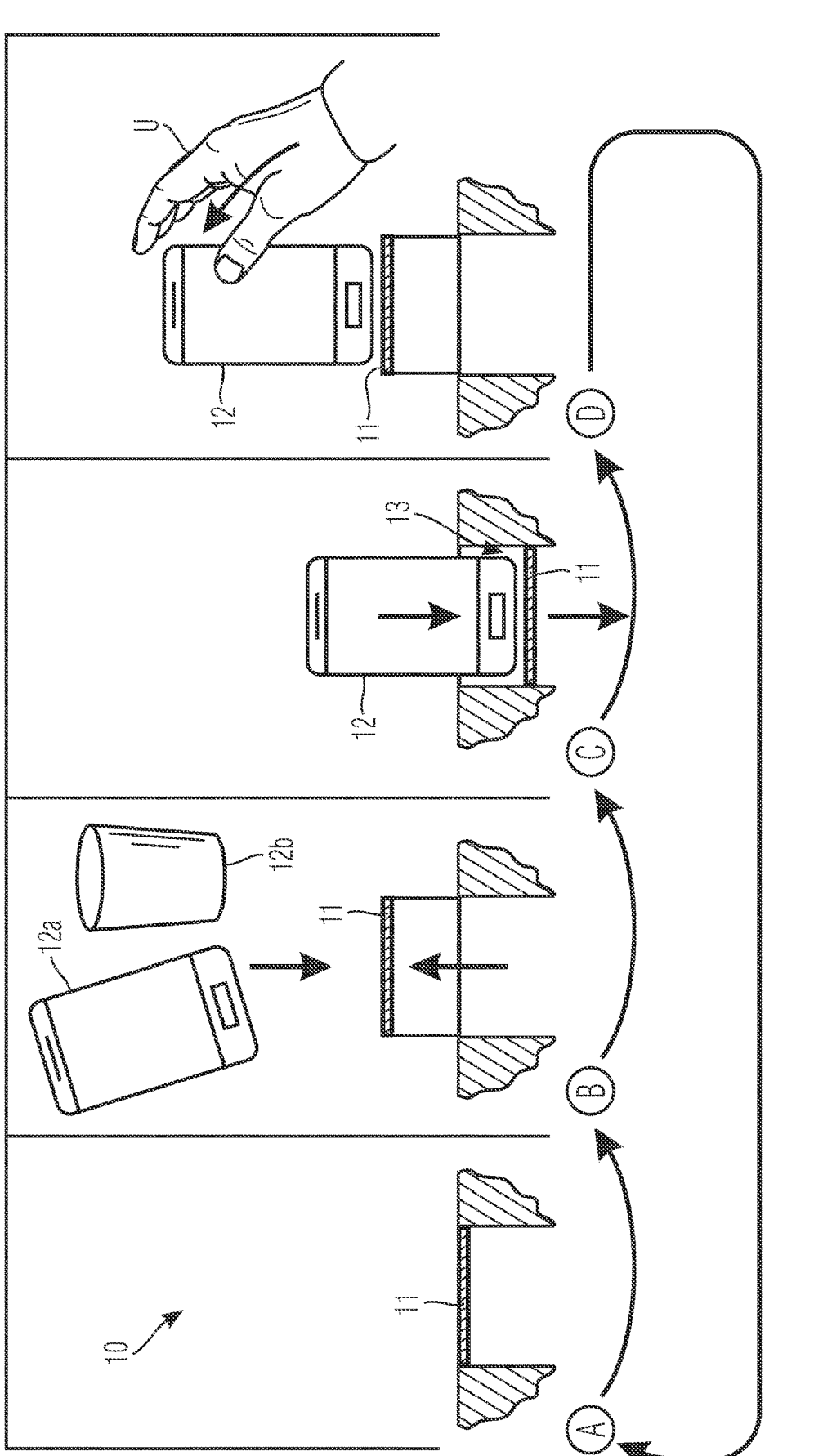
FIG. 2 shows a sequence of receiving and releasing an object by the holding device.

FIG. 2 shows a sequence of receiving and releasing an object by the holding device. In a first state A, the base plate 11 is positioned in the neutral position. When an approaching object 12a, 12b (e.g. smartphone or cup) is detected (e.g. by a sensor of the holding device 10), the base plate 11 can be elevated to meet the object (shown in second state B). Afterwards, when the object 12 is placed by a user U, the holder retracts with the object 12 (base plate 11 is lowered into the cavity 13), resulting in a third state C. When the user U wants to pick up the object 12 again and the hand of the user U approaches the holding device 10 (e.g. detected by the sensor, see e.g. FIG. 6), the holder elevates to meet the hand of the user U (fourth state D) which can increase the comfort for the user when taking the object 12 back. When the object 12 is removed, the holding device 10 can bring the base plate 11 back in the first state A (neutral position) so that other objects 12 can be placed on the support, for example.

More details and aspects of the concept are mentioned in connection with the proposed concept or one or more examples described above or below (e.g. FIGS. 1a to 1c and FIGS. 3a to 8). The concept may comprise one or more additional optional features corresponding to one or more aspects of the proposed concept or one or more examples described above or below.

Figures 3A, 3B, 3C, 4A, 4B, 4C, 4D:
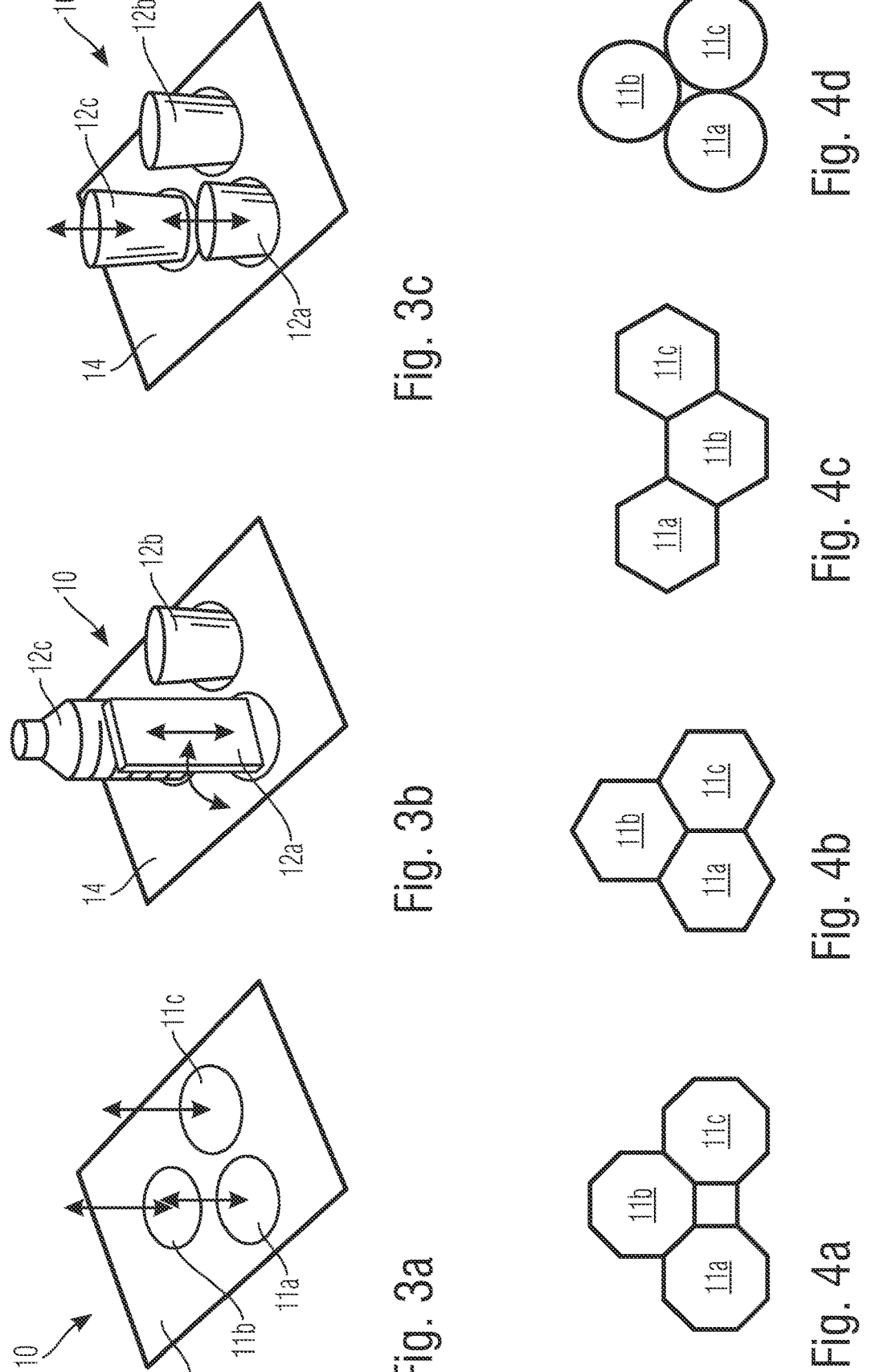
FIG. 3*a* shows a perspective representational view of a holding device with three base plates in a first situation of use.
FIG. 3*b* shows a perspective representational view of the holding device of FIG. 3*a* with three base plates in a second situation of use.
FIG. 3*c* shows a perspective representational view of the holding device with of FIG. 3*a* three base plates in a third situation of use.
FIG. 4*a* shows a schematic representation of a first form and arrangement pattern of base plates.
FIG. 4*b* shows a schematic representation of a second form and arrangement pattern of base plates.
FIG. 4*c* shows a schematic representation of a third form and arrangement pattern of base plates.
FIG. 4*d* shows a schematic representation of a fourth form and arrangement pattern of base plates.

FIGS. 3a to 3c show a holding device 10 with three base plates 11a-11c in different situations of use. FIG. 3 a shows a holding device 10 with three circular base plates 11a-11c in neutral positions. Each of the base plates 11a-11c can support an object 12, e.g. a smartphone, a bottle, a cup, a can, keys or a wallet.

FIG. 3b shows the holding device 10 in use, wherein a smartphone 12a is supported by the first base plate 11a, a cup 12b is supported by the second base plate 11c, and a bottle 12c is supported by the third base plate 11b. The three base plates 11a-11c may be adjusted such that the top of the three objects 12a-12c may be in a similar height above the body 14 of the holding device 10.

FIG. 3c shows the holding device 10 with three other objects 12a-12c (e.g. cups). Here, the position of the three base plates 11a-11c may be set such that the tops of the three objects 12a-12c are at different positions which may make it easier for a user to take one single object from the holding device 10.

More details and aspects of the concept are mentioned in connection with the proposed concept or one or more examples described above or below (e.g. FIGS. 1a to 2 and FIGS. 4a to 8). The concept may comprise one or more additional optional features corresponding to one or more aspects of the proposed concept or one or more examples described above or below.

FIGS. 4a to 4d show different forms and arrangement patterns of base plates 11a-11c. FIG. 4a shows octagonal base plates 11a-11c in a honeycomb pattern, and FIG. 4b shows hexagonal base plates 11a-11c in such pattern. FIG. 4c shows the hexagonal base plates 11a-11c in an elongated pattern, and FIG. 4d shows circular base plates 11a-11c in a honeycomb pattern. Each form and arrangement may be advantageous for supporting specific objects 12 and may be chosen according to the requirements to the holding device 10.

More details and aspects of the concept are mentioned in connection with the proposed concept or one or more examples described above or below (e.g. FIGS. 1a to 3c and FIGS. 5a to 8). The concept may comprise one or more additional optional features corresponding to one or more aspects of the proposed concept or one or more examples described above or below.

Figure 5A:
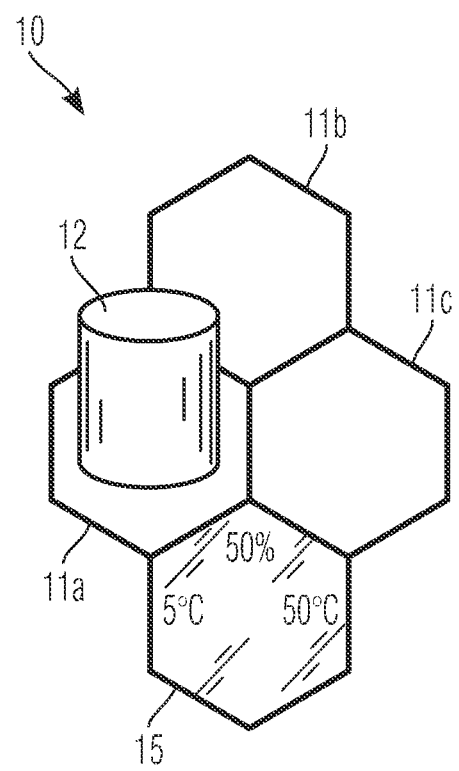
FIG. 5*a* shows a holding device with a display for controlling the holding device and/or displaying a status of the holding device or an object supported by the holding device in a first configuration with the object.
Figure 5B:
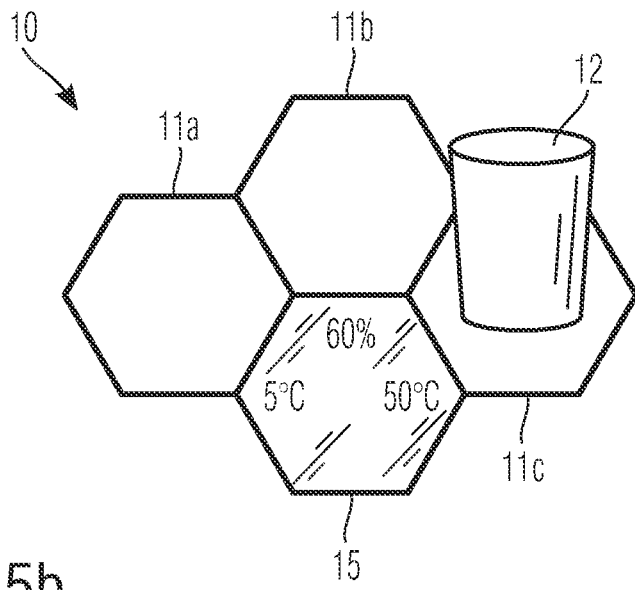
FIG. 5*b* shows a holding device with a display for controlling the holding device and/or displaying a status of the holding device or an object supported by the holding device in a second configuration with the object.

FIGS. 5a and 5b show a holding device 10 with a control device 15 (e.g. touch display 15) for controlling the holding device 10 and/or displaying a status of the holding device 10 or an object 12 supported by the holding device 10. The control device 15 may be a touchscreen providing a control graphical user interface, for example. For example, information like battery charge or temperature of the object may be displayed.

In FIG. 5a, a soda can 12 is supported by the first base plate 11a. Correspondingly, the touchscreen 15 may output a temperature of the content of the can 12 (e.g. 5° C.). FIG. 5b shows a smartphone 12 being supported by the third base plate 11c. Correspondingly, the touchscreen 15 may output a charging state of the smartphone battery (e.g. 50%). The color of the displayed information may correspond to the value, e.g. cold temperature may be displayed in blue color whereas hot temperature may be displayed in red color; or a low battery state may be displayed in red color whereas a high battery state may be displayed in green color. For example, an illuminating element of the relevant base plate may further illuminate the corresponding object 12 in said color.

More details and aspects of the concept are mentioned in connection with the proposed concept or one or more examples described above or below (e.g. FIGS. 1a to 4d and FIGS. 6 to 8). The concept may comprise one or more additional optional features corresponding to one or more aspects of the proposed concept or one or more examples described above or below.

Figure 6:
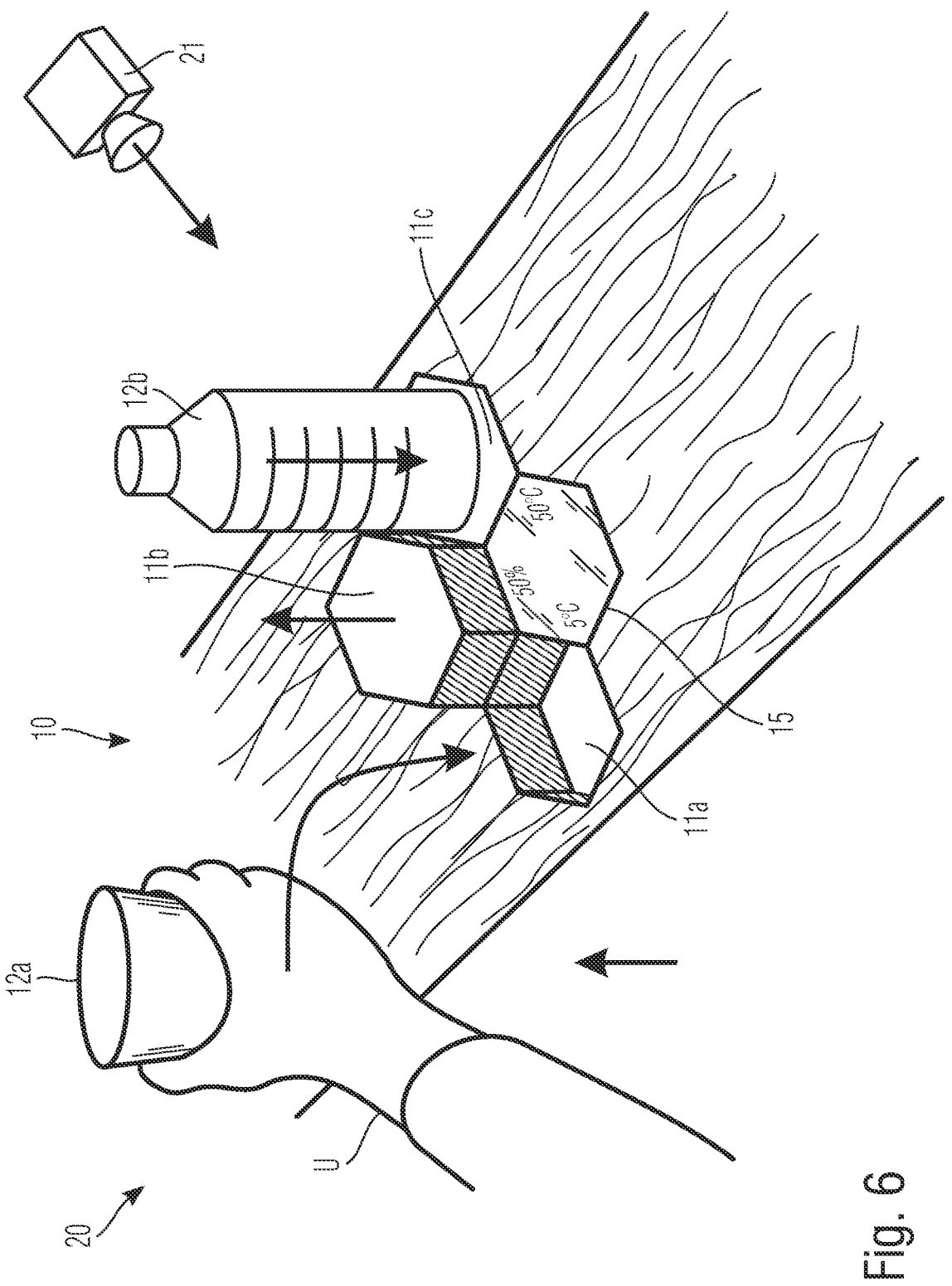
FIG. 6 shows a system comprising a holding device and a sensor configured to detect an object or a user.

FIG. 6 shows a system 20 comprising a holding device 10 and a sensor 21 to detect an object 12 or a user U. The sensor 21 may be a camera (e.g. RGB-camera or IR-camera), a force or height sensor (e.g. enabling sensing a force acting on the base plate 11), and/or a touch sensor (e.g. capacitive sensing of object or user approach). The sensor 21 may be a combination of one or more sensors (sensor fusion; e.g. Lidar camera, thermal camera, as examples; e.g. proximity or presence sensor like e.g. Radar, Ultrasound, etc.)

The user U may have placed a bottle 12b filled with a warm beverage on the third base plate 11c which then lowers to support the bottle 12b securely (e.g. when a force sensor senses that the object is put on the base plate 11c). A sensor of the system 20 may measure the temperature of the content of the bottle 12b such that it can be displayed on the touchscreen 15 of the holding device 10 (e.g. 50° C.). The user U may further control the touchscreen 15 (control device) to set functions of the holding device 10, for example. Further, the user U may place a cup 12a with a cold drink on the first base plate 11a which can be positioned according to the height of the cup 12a. A temperature of the drink in the cup 12a can be displayed on the touchscreen 15 (e.g. 5° C.).

More details and aspects of the concept are mentioned in connection with the proposed concept or one or more examples described above or below (e.g. FIGS. 1a to 5b and FIGS. 7a to 8). The concept may comprise one or more additional optional features corresponding to one or more aspects of the proposed concept or one or more examples described above or below.

Figure 7A:
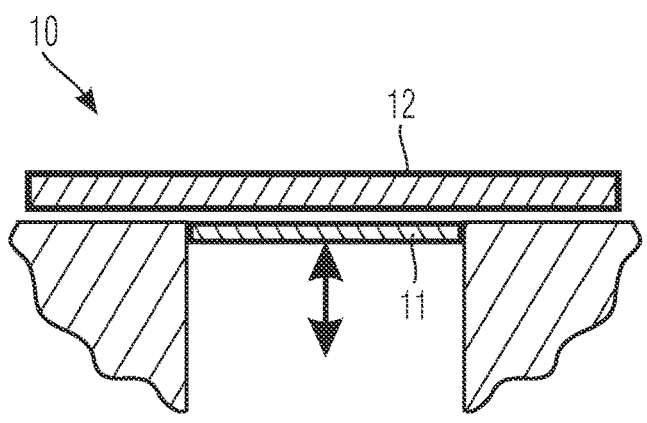
FIG. 7*a* shows a representative cutaway view of a holding device supporting a smartphone in a first position.
Figure 7B:
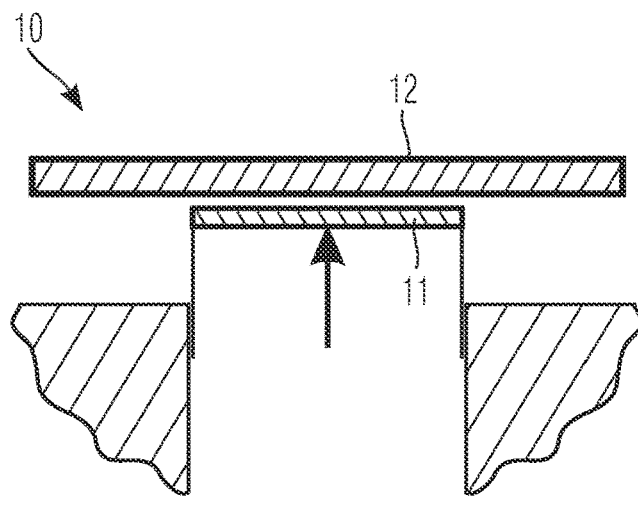
FIG. 7*b* shows a representative cutaway view of the holding device of FIG. 7*a* supporting a smartphone in a second position.
Figure 7C:
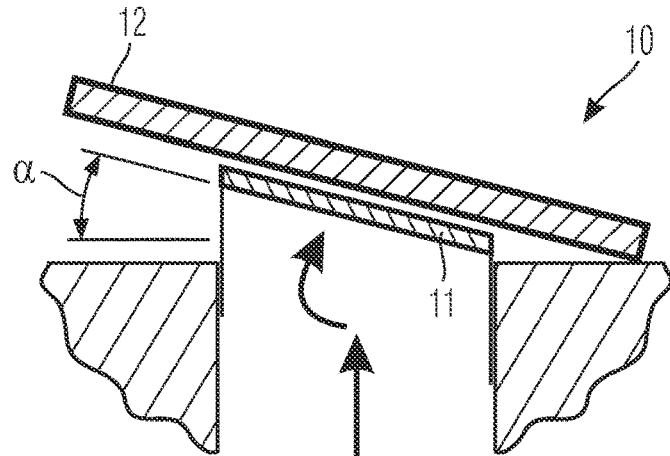
FIG. 7*c* shows a representative cutaway view of a holding device of FIG. 7*a* supporting a smartphone in a third position.

FIGS. 7a to 7c show a holding device 10 supporting a smartphone 12 in different positions. In FIG. 7a, the smartphone 12 is laid flat on the base plate 11 which is in a neutral state. For example, a magnet element of the base plate 11 can support the smartphone 12. FIG. 7b shows the smartphone 12 in an elevated state, so that the user can take easier, for example.

FIG. 7c shows the smartphone 12 being inclined, e.g. at an angle α. The angle α can be set automatically according to a position of the user (e.g. detected by the sensor device 21 like camera or LIDAR sensor; or measured by use of internal phone sensors like MEMs/IMU data shared with the system, see above), e.g. resulting in improved visibility of the smartphone display while being supported by the holding device 10. Inclining the smartphone 12 may be achieved by inclining the base plate 11 itself, e.g. by using two or more separate actuators for altering opposite sides of the base plate 11 individually.

More details and aspects of the concept are mentioned in connection with the proposed concept or one or more examples described above or below (e.g. FIGS. 1a to 6 and FIG. 8). The concept may comprise one or more additional optional features corresponding to one or more aspects of the proposed concept or one or more examples described above or below.

Figure 8:
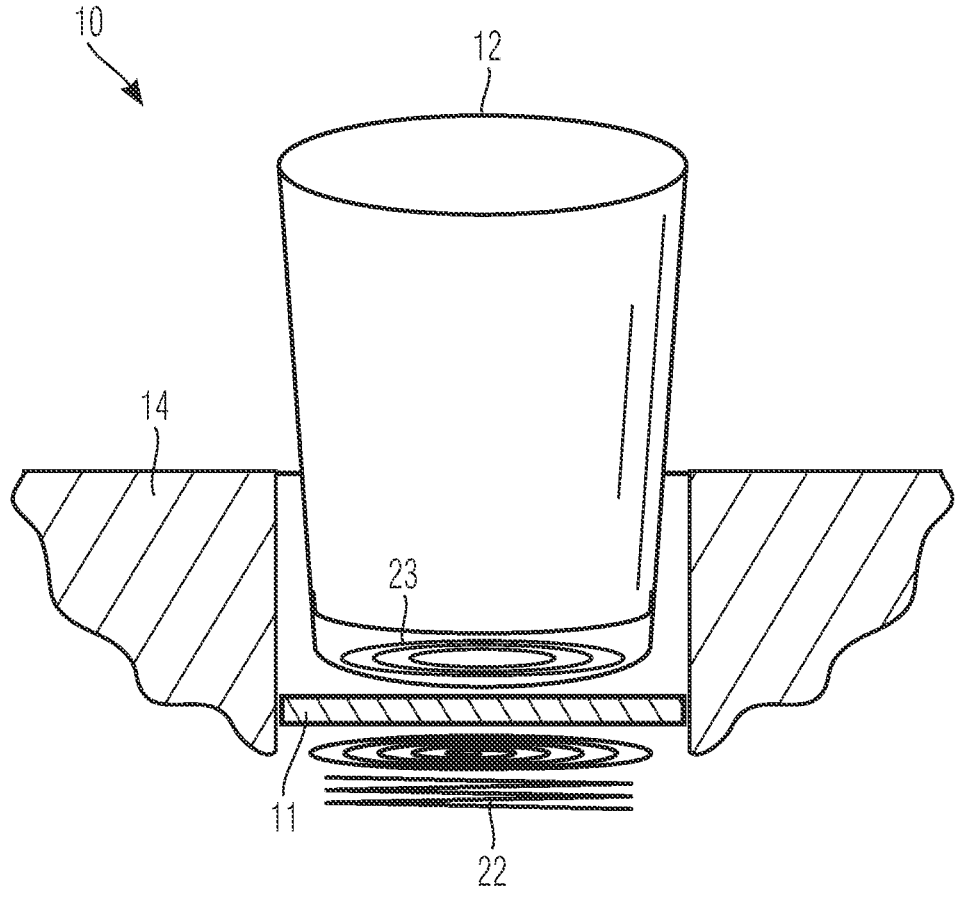
FIG. 8 shows a holding device with a charging and/or heating element.

FIG. 8 shows a holding device 10 with a charging and/or heating element 22 (e.g. induction coil or thermal device). The heating element may be configured to increase or decrease a temperature of the object 12 (e.g. heating or cooling). For example, the object 12 presented in FIG. 8 is a smart cup with a thermal element 23, e.g. induction heating element. The induction coil 22 of the holding device 10 thus may be usable for charging smartphones and/or heating smart cups, for example. Further, cooling a smartphone while being charged may be advantageous to avoid high temperatures of the smartphone due to the charging process and phone activity, for example.

More details and aspects of the concept are mentioned in connection with the proposed concept or one or more examples described above or below (e.g. FIGS. 1a to 7c). The concept may comprise one or more additional optional features corresponding to one or more aspects of the proposed concept or one or more examples described above or below.

Aspects relate to a holding device for a vehicle. For example, the holding device comprises two or more (e.g. three or four) adaptable base plates (e.g. supports or holders; e.g. positions, places, compartment, cavity, platform, location) to accommodate various objects including (but not limited to) one or more smartphones and/or beverage containers (e.g. cup, paper cup, container, can, glass, bottle, etc.). Additionally, the adaptable supports may receive (e.g. hold, accept, support, rest, etc.) other objects (e.g. keys, wallet, lipstick, candy/chocolate, etc.) that are placed there, if appropriately sized or shaped.

Optionally or additionally multiple supports may be activated simultaneously or in synchronization according to the recognition of a single or multiple objects and the characteristics of those objects (e.g. size, shape, type (e.g. beverage vs. food), requirements, prediction, historic patterns, etc.).

An optional touchscreen (e.g. control device 15) of the holding device 10 (e.g. OLED, LCD, MicroLED, e-paper, etc.) or control panel (e.g. with buttons) for controlling aspects that relate to individual and/or all supports may be provided; for example comprising of position, orientation, retracted/extended, open/closed, temperature, power or charging status (e.g. wireless (e.g. induction) or wired (e.g. electrical contacts) connection for powering or charging a device (e.g. smartphone, beverage container, other accessory, etc.).

Additionally, the support (e.g. base plate 11) or area around the supports may incorporate other multi-sensory aspects such as lighting/illumination, digital projection, haptics, etc. For example, scent may be released during certain moments that the user U interacts with the beverage container (or object 12) and/or support. For example the illumination, may illuminate the cup or bottle (e.g.) to communicate the temperature (e.g. blue for cold, red for hot, green for ambient temperature) of the beverage and/or status of the heating or cooling. Additionally, the system may be synced with a digital or virtual AR/VR/MR component, so that the position and status of the object (e.g. beverage or smartphone can be seen in that virtual format (e.g. AR/VR/MR, etc.). Computer Vision and sensing—recognizing and identifying users and objects. Tracking user hand and finger position, learning from user behavior. Tracking relative position and motion of user (e.g. hand/fingers) relative to objects and vehicle cabin and interior surfaces and features. Tracking relationships and patterns of behaviors (e.g. touching and picking and placing beverage containers, objects, drinking/eating, etc.) during journey and across multiple journeys (e.g. history). Technical solutions include camera sensing (e.g. RGB, IR, TOF, Lidar, etc.; e.g. thermal, point cloud, depth-sensing, etc.), force sensing (e.g. pressure sensor, weight sensor, etc.) optical sensor (e.g. photo sensor, IR sensor, etc.), capacitive sensing, ultrasound, etc. combined with data processing/analysis including AI, ML, DNN, etc. approaches.

One or more sensors 21 (e.g. camera, ultrasound, radar, etc.), for example, located on the exterior and/or interior of the cabin, may sense the presence of one or more users U and/or objects 12 around the vehicle exterior (e.g. approaching, walking towards, standing by, opening the door, etc.) or inside the vehicle (e.g. entering the vehicle, positioning or settling into the vehicle/seats, etc.) when the vehicle is stationary (e.g. stopped, parked, etc.) or in motion (e.g. driving, autonomous driving mode, etc.).

The system 20 e.g. uses object recognition approaches (e.g. AI, ML, DNN, etc.) to recognize (e.g. classify), identify (e.g. unique identifier) the person or object, and track one or more aspects of the subjects (e.g. use and/or object, e.g. position, orientation, motion, etc.) and if there are multiple subjects (e.g. smartphones and cups, etc.) the relative relationships between them (e.g. proximity, direction, distance, position, etc.; e.g. vectors, absolute values, etc.)

The system 20 e.g. also applies a learning approach trained by typical users or trained during use for specific vehicle owners/users, journeys, etc., such that historic patterns or usage may inform future predictions of usage.

For example, a thermal sensor 21 (e.g. camera/system with thermal measurement capability) may assess the temperature of the subject (e.g. object, user, e.g. beverage cup, etc.) and determine if heating or cooling is required (e.g. cooling is applied if a smartphone is hot or too hot, cooling is required for a soda can (e.g.) that appears below a certain temperature or heating is required if a cup (e.g.) is above a certain temperature. The optical camera may also provide information about the object to determine or influence how heating or cooling is managed (e.g. by recognizing the type of object or device, etc.) Optionally a GUI may be activated (on the touchscreen of the system 20 or CID of a car with the system, for example) that allows the user to adjust or set the temperature and/or holder configuration, this may or may not influence future usage predictions.

The adaptable supports may have multiple positions or infinitely variable positions between extremes. For example, the supports may have three nominal positions relative to the surrounding surfaces: fully retracted (e.g. position P2 in FIG. 1; e.g. inward, open/opening, creating an aperture, cavity, container, etc.), neutral (e.g. position P1 in FIG. 1; e.g. flat/flush with the surrounding surface, closed), fully extended (e.g. position P4 in FIG. 1; e.g. outward, protruding, elevated, creating a platform, etc.). Optionally, the adaptable support (e.g. base plate 11) may change orientation, angle or shape in any position. The motion may be optional or as a result of the articulation or actuation. For example the support may change angle to better position a smartphone (or any object; e.g. see FIG. 7c) relative to the user, e.g. angle the smartphone display towards the user to improve visual and touch access to the touchscreen.

The adaptable supports (e.g. base plates 11) may be articulated or actuated by a means such as a motor or actuator (e.g. electro-mechanical, pneumatic, mechanical, hydraulic, etc. e.g. linear or rotary actuator, e.g. stepper motor, servo motor, etc.). Additionally the motion may have a means such as spring and/or dampening to control the motion and acceleration of the moving parts.

The surrounding surfaces (e.g. around the base plate or multiple base plates) may have any normal orientation (e.g. horizontal, inclined, declined, etc.) or be shaped (e.g. flat, curved, 3-dimensionally shaped, etc.).

For example, the system 20 may at some moment recognize the user U is holding a smartphone (e.g. on entering the vehicle or during a journey) and optionally evaluate if the user is likely to place the smartphone down. The adaptable support may be initially or normally flat/flush when a smartphone is proximal to or placed at the location of the support. The support may elevate and/or elevate and incline to improve the access to the smartphone display (visual and touch). A magnetic feature (e.g. permanent magnets and/or electromagnets) on the support e.g. holds the smartphone in place during use. When the user removes the smartphone from the support, the support may automatically retract or the system may smartly consider the likelihood that the user will replace the smartphone (e.g. evaluating factors such as the end of the journey, parked drive mode, an incoming phone call or message, the completion of a phone call, etc.)

In an example, an induction charger integrated into the surface of the support may be activated to charge the smartphone, and/or the heating/cooling feature may be activated to cool the smartphone if necessary, for the duration of the time the smartphone is resting on the support.

The support may also predictively activate (e.g. actuate the motion of) an adaptable support or aspect of or proximal to the support (e.g. lighting/illumination feature, haptic, thermal, display/touchscreen, etc.) that is most appropriate for the user. E.g. activating the support (e.g. base plate 11) closest to the user that is available (e.g. if nothing is already placed on the support).

Additionally or optionally the system 20 may receive information or data from the smartphone on the status or condition of the smartphone and/or smartphone apps (e.g. orientation, motion, ambient light levels, battery level, temperature, etc.) via wired or wireless connection (e.g. Bluetooth, Apple Carplay, Google Auto, etc.) Additionally, the system may take instructions, bi-directional communication or commands from an Intelligent Personal Assistant (IPA), e.g. BMW, Ski, Google, Alexa, etc.

Optionally or additionally the system may recognize when the smartphone (or any object) is presented to the support in a specific orientation or configuration. E.g. if the smartphone is placed on the support vertically and not laying horizontally the support may retract or adapt to hold the smartphone vertically or at an angle to the vertical axis, and optionally not activate (or activate) certain features/functions (e.g. charging, cooling, illumination, etc.).

Similarly to the smartphone example, the system can appropriately respond to the user holding, offering or placing a beverage container on the support. The support for example may retract when the beverage is placed on the support (or when the vehicle starts to move or vehicle dynamics require stabilizing the beverage container), or remain flush if the vehicle is not in motion (or if the user touches or continues to touch or hold the container) or elevate/extend upwards to present the beverage to the user (e.g. when the user reaches for the container, or when the system recommends taking a break or drinking some water; e.g. the beverage appears to be presented to the user on a platform or pedestal). Additionally, the system may evaluate driver distraction (e.g. using the onboard driver camera) to influence this feature. For example, during traffic or navigation intensive areas (e.g. determined from the navigation system) this ability may be postponed, to avoid further distracting the driver.

Additionally the sensor(s) 21 (e.g. camera and/or force sensors) may adapt the support according to the size of the beverage container (or object); for example the system 20 may increase the retraction depth of the support for a big or tall cup or bottle or may reduce the retraction depth for a small or short cup or object (e.g. keys, lipstick, etc.).

Additionally or optionally the system may smartly adapt the position of the support to best suit the type of object, physical characteristics and/or functionality of the object (e.g. size, shape, orientation, thickness, magnetic function, thermal function, etc.). For example, a wallet or candy bar will be treated differently to a smartphone or cup with magnetic charging or heating/cooling requirements. For example, the system may identify condensation or potential for condensation and for example may respond by activating additional cooling, air flow (e.g. to dry and/or cool). Additionally, this disclosure assumes that the supports are adapted in 1 axis or dimension. It is possible to adapt the supports across one or more axes or dimensions; or for example to increase the size or diameter of the support (e.g. to increase or decrease the size of the aperture or support surface according to the size/footprint of the object (e.g. a thin soda can vs. an American sized "super gulp" 24 oz container). This could be achieved by a means such as a mechanical and/or material based solution (e.g. elastomeric surfaces of the base plates 11 that stretch or contract when actuated).

Sensors may be used to detect the object so that the holding device can adapt one or more adaptable supports (e.g. base plates).

Additionally, a smart beverage container accessory is proposed that leverages the magnetic and induction charging feature, both to hold the container in place (e.g. to prevent chattering or vibration of the cup) and charge the container.

Additionally the system may also recognize and adapt according to food or food related objects; e.g. heating or cooling and/or maintaining temperature; e.g. keep warm (e.g. burrito, burger, fries, etc.) or keep cool (e.g. sandwich, fruit, ice cream, etc.).

Aspects relate to an intelligent adaptive smartphone and beverage support system with e.g. three or more adaptable supports (e.g. base plates 11), e.g. articulated by an electro-mechanical actuator, e.g. incorporating induction electrical power supply (for charging or powering) and thermal management solution (heating and/or cooling, e.g. HVAC or TEC (thermoelectric cooling/heating))

The system may comprise an optional touchscreen that may provide different GUI options/capabilities related to the vehicle and/or adaptable support system (e.g. controlling support state, thermal and/or charging states, etc.). Although it should be noted that it is intended that the system largely operates autonomously or automatically, therefore the touchscreen GUI may provide a combination of feedback and control. Additionally, the system may allow virtual representation of the support system and objects (e.g. smartphone, beverages and other objects) via AR/VR/MR, such that the system and objects are represented in the virtual space.

Multi-sensory features of the system may enable illumination, lighting, digital projection, haptics, scent. The system may also integrate with other vehicle subsystems (e.g. infotainment, climatization, navigation, etc.) for example providing coordination between the smartphone wireless/digital functionality and the physical state of the smartphone.

Further, a system is proposed which is e.g. incorporating sensors, computer vision, AI/ML/DNN to enable object recognition, identification and tracking of users, smartphones, and beverage containers and other objects (or types of objects).

The adaptable supports e.g. are actuated according to the behavior and needs of the user and objects (type, function, requirements, size, orientation, configuration, etc.) as determined by the system. Therefore, the system is configured to monitor user behavior and usage patterns and applies learnings across the journey and multiple journeys.

The system may adapt in more specific ways for a smartphone, such as adjusting the smartphone angle to enhance usability or responding to the state/activity/functionality of the smartphone (e.g. charging, receiving a call, active navigation, notification, video call, etc.).

The system may adapt the support for different object states—for example beverages container states such as:

a) Beverage/cup presence: Cup present, no cup present, proximity, motion, etc.

b) Beverage interaction: user touching cup, picking up cup, holding cup, drinking, moving towards cup holder, proximity to cup holder, placing cup, etc.

c) Vehicle status: parked, stationary, driving, etc.

d) Vehicle dynamics: Road conditions, acceleration/motion of vehicle (e.g. need to stabilize or hold beverage e) Type of beverage: e.g. hot, cold, iced, etc. (e.g. identified by thermal profile, appearance, label, container type, etc.)

f) Beverage condition: temperature, hot, cold, condensation, etc.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

What is claimed is:

1. A holding device for a vehicle, the holding device comprising:

at least a first base plate configured to support an object; and a cavity formed in a body of the holding device and configured to receive the first base plate and to at least partially receive the object being supported by the first base plate, wherein the holding device is configured to alter a position of the first base plate within the cavity depending on the object;

wherein the holding device is configured to detect a characteristic of the object and to adapt the position of the at least the first base plate according to the characteristic; and wherein the holding device is configured to tilt the at least the first base plate depending on the characteristic of the detected object.

2. The holding device according to claim 1, wherein the holding device comprises at least two base plates, wherein the holding device is configured to alter the positions of each of the two base plates independently.

3. The holding device according to claim 1, wherein the holding device comprises at least three base plates, and wherein the three base plates are arranged in a honeycomb pattern.

4. The holding device according to claim 1, wherein the holding device is configured to receive a signal from a sensor when the sensor detects an object approaching the holding device, and wherein the holding device is configured to elevate the first base plate when the signal is received by the holding device.

5. The holding device according to claim 1, wherein the holding device is configured to receive a signal from a sensor when the sensor detects a user approaching the holding device, and wherein the holding device is configured to elevate the object supported by the first base plate when the signal is received by the holding device.

6. The holding device according to claim 1, further comprising an inductive electrical power supply device and/or a thermal device configured to affect the object being supported by the first base plate.

7. The holding device according to claim 1, further comprising: a magnetic element placed at the first base plate to at least partially magnetically support the object.

8. A vehicle comprising a holding device according to claim 1, wherein the holding device is controlled based on a status of the vehicle.

9. A holding device for a vehicle, the holding device comprising:

at least a first base plate configured to support an object; and a cavity formed in a body of the holding device and configured to receive the first base plate and to at least partially receive the object being supported by the first base plate, wherein the holding device is configured to alter a position of the first base plate within the cavity depending on the object;

wherein the holding device is configured to receive a signal from a sensor when the sensor detects that no object is present at the holding device, and wherein the holding device is configured to position the first base plate substantially planar with a surface of the body of the holding device when the signal is received by the holding device.

10. The holding device according to claim 9, wherein the holding device is configured to detect a characteristic of the object and to adapt the position of the at least the first base plate according to the characteristic.

11. A vehicle comprising a holding device according to claim 10, wherein the holding device is controlled based at least in part on a status of the vehicle.

12. The holding device according to claim 10, wherein the position of the at least the first base plate is adapted to control an orientation of the object in relation to a user of the holding device.

13. The holding device according to claim 9, further comprising:

an illuminating element configured to emit light depending on a status of the object and/or a status of the holding device.

14. The holding device according to claim 9, wherein the holding device is configured to alter a position of the first base plate within the cavity depending on information relating to the object.

15. The holding device of claim 14, wherein the information comprises information provided by a sensor, wherein the sensor detects a characteristic of the object.

16. A system comprising a holding device according to claim 1, and a sensor device configured to detect a characteristic of an object to be supported by the holding device, wherein the system is configured to control the holding device (10) depending on the characteristic.

17. The system according to claim 16, wherein the system is configured to output a virtual representation of the object in a virtual reality environment.

18. The system according to claim 16, further comprising:

a control device configured to control the holding device.

* * * * *